United States Patent [19]

Christopher et al.

[11] Patent Number: 4,731,389

[45] Date of Patent: Mar. 15, 1988

[54] FOAM INSULATION AND PROCESS FOR PRODUCING THE SAME

[75] Inventors: R. Keene Christopher, Weedsport, N.Y.; Donald Thomson, Inverness, Fla.

[73] Assignee: Air Krete, Inc., Weedsport, N.Y.

[21] Appl. No.: 798,145

[22] Filed: Nov. 14, 1985

Related U.S. Application Data

[63] Continuation of Ser. No. 602,158, Apr. 19, 1984, abandoned and a continuation-in-part of PCT US/83/01335, Aug. 29, 1983, which is a continuation-in-part of Ser. No. 414,953, Sep. 3, 1982, abandoned.

[51] Int. Cl.$^4$ .......................... C08J 9/30; C08J 9/32; B29C 39/10; E04B 2/34

[52] U.S. Cl. ........................ 521/103; 264/42; 264/46.5; 264/50; 264/DIG. 6; 521/84.1; 521/85; 521/91; 521/92; 521/109.1; 521/122; 521/125; 521/134; 521/141; 521/149

[58] Field of Search .................. 264/42, 45.3, DIG. 6, 264/46.5, 50; 521/83, 91, 100, 84.1, 85, 92, 109.1, 122, 125, 134, 141, 149

[56] References Cited

U.S. PATENT DOCUMENTS 2,384,611 9/1945 Douthett ........................... 521/91 X
2,921,357 1/1960 Fujii et al.
4,100,115 7/1978 Baer ..................................... 521/83
4,644,014 2/1987 Thomson et al. ............... 264/46.5 X

FOREIGN PATENT DOCUMENTS 24327 7/1972 Australia .
2212826 7/1974 France .
57-170868 10/1982 Japan ........................... 264/DIG. 6

Primary Examiner—Philip Anderson
Attorney, Agent, or Firm—Parkhurst & Oliff

[57] ABSTRACT

The invention relates to foams for insulating cavities and structures, such as spaces between walls in houses. The inventive foam compositions are prepared in separate portions, generally comprising (A) cement and (B) foam. Air is added initially to foam one of the components or a mixture of components.

In a first embodiment, the first component comprises an aqueous solution of polyvinyl alcohol and a dispersant. This component is mechanically foamed by injection of air, for example. After the mechanical foaming a second, cement component is added to the first component. This second component comprises an aqueous solution, mixture or suspension of magnesium oxide and barium metaborate, and a dispersant.

In a second, preferred embodiment, the first component comprises an aqueous solution of polyvinyl alcohol and calcium chloride, which component is mechanically foamed by injection of air. After the foaming a second component is added, comprising an aqueous solution of Portland Cement, a dispersant and sodium metaborate.

45 Claims, 1 Drawing Figure

FOAM INSULATION AND PROCESS FOR PRODUCING THE SAME

CROSS-REFERENCE TO RELATED APPLICATION

This is a continuation of Ser. No. 602,158, filed Apr. 19, 1984 and now abandoned and a continuation-in-part of our prior pending application PCT/U.S. No. 83/01335, filed Aug. 29, 1983, which is a continuation-in-part of our earlier application Ser. No. 414,953, filed Sept. 3, 1982, now abandoned.

BACKGROUND OF THE INVENTION

1. Field of the Invention

The present invention relates to foams which are useful for insulating cavities and structures, such as spaces between walls in houses. The inventive foam compositions are typically prepared in various separate portions, generally comprising (A) cement and (B) foam. Air is added initially to foam one of the components or a mixture of components.

2. Description of the Prior Art

In the past, it has been known to use an urea-formaldehyde foam for insulating cavities and structures. However, use of that foam was prohibited because of alleged health hazards to occupants of structures in which that foam had been used.

It has also been known to use a reaction of magnesium oxide with magnesium chloride or magnesium sulfate to produce an oxychloride or oxysulfate cement.

SUMMARY OF THE INVENTION

It is an object of this invention to provide a foam which can be used for insulating structures.

It is another object of this invention to provide a foam-cement mixture wherein the foam maintains sufficient integrity to maintain its shape and volume until the inter-mixed cement sets or hardens to fix the composition in place.

It is a further object to provide a foam which is made from materials which are not irritating to occupants of structures in which the foam is used.

It is a still further object of this invention to provide a process for making the foam discussed in the previous two objects.

It is a still further object of this invention to provide a foam and a process for making a foam which can be easily used to install the foam in a structure.

The above objects and others are obtained by providing a foam which is made by combining two separate component mixtures, whereby to a mechanically air-foamed first component is added a second component.

In a first embodiment, the composition comprises two portions, plus air, in which the initially foamed portion comprises an aqueous solution of polyvinyl alcohol and a dispersant, and the second, cementitious portion comprises an aqueous solution mixture, or suspension of magnesium oxide and barium metaborate. In a second, preferred embodiment an initially air-foamed portion comprises an aqueous solution of polyvinyl alcohol with a minor amount of calcium chloride, and a second portion comprising an aqueous solution, mixture or suspension of Portland cement and a minor amount of sodium metaborate. The foam obtained provides a good insulation R value and has properties including flame resistance, low shrinkage, fast set up time, lack of odor and non-toxicity.

BRIEF DESCRIPTION OF THE DRAWINGS

The FIG. 1 is a partially schematic illustration of the system of forming the foam insulation in accordance with the present invention.

DETAILED DESCRIPTION OF THE INVENTION

Figure 1:
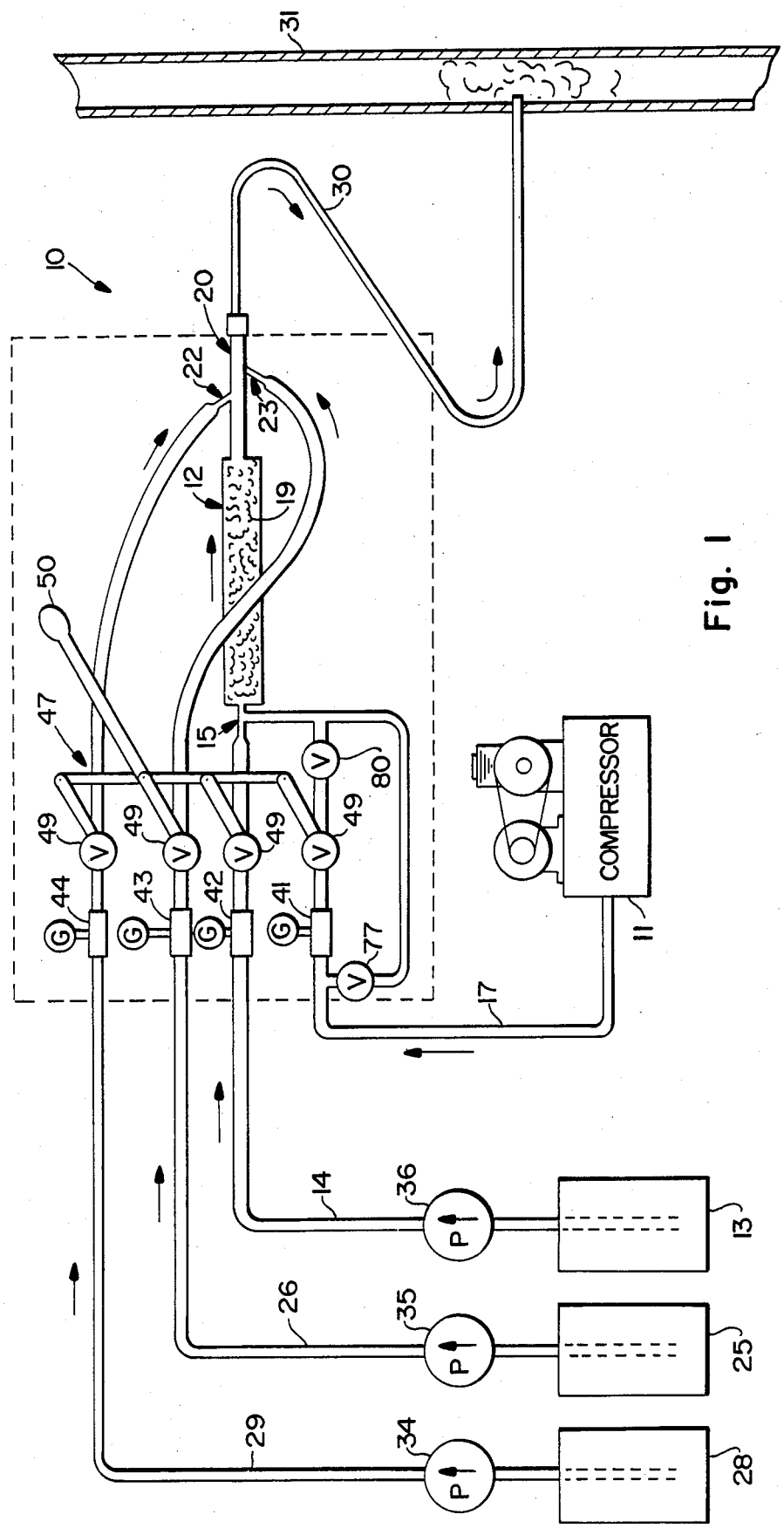

The present invention relates to a foam and a method for producing a foam material which has utility for insulation. The insulation can be used either in cavities, such as those found between walls, or in open spaces, such as attics. The foam is useful for both new construction and for existing structures.

The foam is typically produced through the combination of two components and air.

In a first embodiment, the first component comprises an aqueous solution of polyvinyl alcohol and a dispersant. This component is mechanically foamed by injection of air, for example. After the mechanical foaming a second, cement component is added to the first component. This second component comprises an aqueous solution, mixture or suspension of magnesium oxide and barium metaborate, and a dispersant. The foamed first component provides support for the cement formed by the second component. Thus the first component exhibits enough strength and does not collapse before the cementitious portion of the composition obtains sufficient rigidity and integrity to maintain the solid shape of the foam.

For the dispersants, a sodium salt of a carboxylated polyelectrolyte may advantageously be used. Tamol 165 is an ammonium salt of polymeric carboxylic acid, and Tamol 731 SD is a sodium salt carboxylate polyelectrolyte, both available from Rohm & Haas Co. Additionally, a dispersant known as Daxad-30, a sodium salt of a carboxylated polyelectrolyte Registered Trademark of W. R. Grace & Co., is useful. It is desirable that precipitated calcium carbonate be used in the second component in some embodiments because of its fluffiness. However, other forms of calcium carbonate could be used.

The material formed by this process can be injected into a structure and will hold its form. The foam sets in about 1 to 10 seconds and has a cure time of approximately 7–21 days at ambient temperatures. The working time or pot life of the combined first and second components can vary from 1–5 hours. This can be controlled through the use of the polyelectrolyte dispersants. The density of the finished foam is controlled by adjusting the air entrainment in the finished foam. A small variable amount of water remains in the foam, depending upon the relative humidity of the atmosphere in which it is installed.

Extenders may also be included in the first component. The extenders may be selected from precipitated calcium carbonate, feldspar, perlite, microspheres, phenolic balloons zeospheres, talc, aluminum trihydrate, clay and regular carbonates. Microspheres are micron-sized hollow spheres of sodium silicate.

It is preferred that the final foam composition include 5–75% by weight magnesium oxide or other cementitious material. It has been discovered that a 1–5% by weight solution of soap in water can be included with the first component to decrease the water absorption of the final foam. A foam without the soap solution had a water absorption of 15-40% by weight. After the addition of this soap solution, the foam obtained showed a water absorption which was reduced to 1-2% by weight. Ivory brand and Fels Naptha brand soaps have found to be useful.

Successful foams were produced using the following compositions. Percentages are in percent by weight of total material.

EXAMPLE I

| First Component (B) | |
| --- | --- |
| Polyvinyl alcohol (8%) | about 15.5-21.2% or about 6-25 lb. |
| Tamol, spray dried | about 0.3-1.7% or about 0.12-2.0 lb. |
| Water | about 38.8-33.9% or about 15-40 lb. |
| Second Component (A) | |
| Magnesium oxide | about 7.7-15.3% or about 3-18 lb. |
| Busan | about 0.6-1.7% or about 0.2-2.0 lb. |
| Water | about 25.4-36.2% or about 14-30 lb. |
| Daxad | about 0.6-0.9% or about 0.25-1 lb. |

Air, to form the bubbled or cellular foam, initially with the first component (B), is an additional component.

In this composition it is believed that the mixture of polyvinyl alcohol from the first Component (B) and the Busan from the second Component (A) quickly react to cause setting of the foam matrix to provide quickly a foam of excellent integrity to support cement until it hardens in place, thus contributing its own even more permanent integrity to the insulative foam product. Busan (TM) is a barium metaborate composition available from Buckman Laboratories. Either 4 mol or 8 mol metaborate may be used. In this composition it is believed that the mixture of polyvinyl alcohol from first component (B), and the Busan from second component (A) quickly react to form a cellular foam, with or without the presence of magnesium oxide. Alternatively, other suitable cementitious materials such as Portland cement, hydraulic cement, aluminous cement, gypsum, gypsum cement, or the like may be used in place of or with magnesium oxide per se. When present, magnesium oxide or other cementitious material contributes long-term integrity and fire resistance to the foam.

EXAMPLE II

In still another method of preparing a cellular foam, the known quick reaction between calcium chloride and sodium silicate is utilized in a new application. The following formula provides an insulating foam structure:

| First Component | |
| --- | --- |
| Calcium Chloride | about 3.5-8.4% or about 1-5 lb. |
| Water | about 53.4-33.6 or about 14-20 lb. |
| Second Component | |
| Sodium Silicate | about 7.1-13.5% or about 2-13.5 lb. |
| Water | about 35.5-42.1% or about 10-25 lb. |
| Fluorad FC100 | about 0.3-2.6% or about 0.1-1.5 lb. |

Fluorad is a Registered Trademark of Minnesota Mining and Manufacturing Co., and is an amphoteric fluorinated alkyl mixture surfactant. Daxad 21, a Registered Trademark of W. R. Grace & Co. may also be used. Daxad 21 is a mono-calcium salt of polymerized aryl alkyl sulfonic acids.

The foam formation technique described in Example I may also be used with this Example II composition.

Further, addition of mica (muscovite) to the First Component contributes to the reaction of the calcium chloride with the sodium silicate and improves the water resistance of the resultant foam. Addition of polyvinyl alcohol to the First Component contributes to the expandability and integrity of the foam.

It is believed that the chemistry which occurs during laminar flow mixing contributes to the desirable results of the present invention. As previously indicated, the idea of having a foam system with sufficient integrity to support cement until the cement can cure is carried out in the composition of Example I by the very fast reaction between the polyvinyl alcohol in the First Component (B) which is foamed, and the Busan, barium metaborate, in the cement containing Second Component (A).

The acrylic resin in the cement component is believed to enhance foamability. Perlite, calcium carbonate, zinc oxide, silicas, calcium silicate, talc and/or clay in the cement component is used for extending the cement, and adding strength to the ultimate composition. Although these elements are desirable, they are not believed to be essential in obtaining a useable foam.

In a second, preferred embodiment, the first component comprises an aqueous solution of polyvinyl alcohol and calcium chloride. This component is mechanically foamed by injection of air. After the mechanical foaming a second component is added to the first component. This second component comprises an aqueous mixture of Portland Cement, a dispersant and sodium metaborate. The foamed first component provides support for the cement formed by the second component. Thus the first component exhibits enough strength and does not collapse before the cementitious portion of the composition obtains sufficient rigidity and integrity to maintain the solid shape of the foam.

EXAMPLE III

A particularly preferred composition is as follows:

| First Component (B) (Foaming Agent) | |
| --- | --- |
| Polyvinyl alcohol (pre-mixed about 11% aqueous solution) | about 46.78% or about 20 lb. |
| Foamability enhancers | about .58% or about ¼ lb. |
| Calcium chloride | about 7.02% or about 3 lb. |
| Precipitated Calcium carbonate | about 1.17% or about ½ lb. |
| 1,3-butylene glycol, or L-14 poly-butene polymer | about 9.36% or about 4 lb. |
| Water | about 35.09% or about 12 to 20 lb. |
| Total batch weight | about 42.75 lb. |
| Second Component (A) (Cement composition) | |
| Portland cement | about 43.40% or about 23 to 31 lb. |
| Cement additives | about .94% or about ½ lb. |
| Precipitated Calcium carbonate | about 2.83% or about 2 lb. |
| Sodium Metaborate (8 mol) | about 5.66% or about 3-4 lb. |
| Glyoxal | about 3.77% or about 2 lb. |
| e-Caprolactam | about 1.89% |

| | -continued | |
|---|---|---|
| INDOPOL L-14 polybutene polymer | about 1.89% or about 2 lb. | |
| NORLIG - 41N | about 1.89% or about ½ lb. | |
| Water | about 37.73% or about 20 lb. | |

More generally these inventive compositions, and more specifically, each component (A) and (B), thereof, may be described in the following approximate weight, and weight percent ranges, respectively:

| | By Weight, lb. | Weight % |
|---|---|---|
| First Component (B) (Foaming agent) | | |
| Polyvinyl alcohol (pre-mixed about 11% aqueous solution) | 5-20 lbs. | 4.32-30.42 |
| Foamability enhancers (total) | (3.75-14.0) | — |
| Calcium chloride | 1.5-4.0 | 1.17-7.51 |
| Precipitated Calcium carbonate | .25-4.0 | 0.20-7.34 |
| 1,3-butylene glycol, or L-14 polybutene polymer | 2.0-6.0 | 1.58-10.95 |
| Water | 12-20 | 9.78-34.04 |
| (B) batch weight - about | 20.75-54 | |
| Second Component (A) (Cement Composition) | | |
| Portland cement | 15-35 | 13.54-49.47 |
| Cement additives (total) | (5.0-16.75) | — |
| Precipitated Calcium carbonate | .25-3 | 0.20-5.61 |
| Sodium Metaborate (8 mol) | 2.5-4.5 | 1.94-8.53 |
| Glyoxal | 1-3 | 0.78-5.69 |
| e-Caprolactam | .5-1.75 | 0.39-3.37 |
| INDOPOL L-14 polybutene polymer | .25-2.0 | 0.19-3.81 |
| NORLIG - 41N or NORLIG - 24C | .5-2.5 | 0.39-4.74 |
| Water | 10-25 | 8.64-38.02 |
| (A) batch weight about | 30.0-76.75 | |

EXAMPLE IV

Another particularly preferred composition is as follows:

| First Component (B) (Foaming agent) | |
|---|---|
| Polyvinyl alcohol (pre-mixed about 11% aqueous solution) | about 47.05% or about 20 lb. |
| Foamability enhancers | about 8.23% or about 3½ lb. |
| Calcium chloride | about 7.08% or about 3 lb. |
| Precipitated Calcium carbonate | about 1.17% or about ½ lb. |
| Water | about 36.47% or about 15.5 lb. |
| (Total batch weight | about 42.5 lb.) |
| Second Component (A) (Cement Composition) | |
| Portland cement | about 27.68% or about 15.5 lb. |
| Cement additives (total) | about 33.81% or about 19.5 lb. |
| Precipitated Calcium carbonate | about 17.86% or about 10 lb. |
| Sodium Metaborate (8 mol) | about 7.14% or about 4 lb. |
| Glyoxal 40 LF | about 1.78% or about 1 lb. |
| e-Caprolactam | about 1.78% or about 1 lb. |
| INDOPOL L-14 (polybutene polymer) | about 1.78% or about 1 lb. |
| NORLIG - 41N or NORLIG - 24C | about 0.89% or about ½ lb. |
| Urea (pre-mixed 50%/50% by wt. with hot water) | about 3.58% or about 2 lb. |
| Water | about 35.78% or about 20 lb. |

More specifically, these inventive compositions, and more specifically, each component (A) and (B) thereof, may be described in the following approximate weight, and weight percent ranges, respectively:

| | By Weight, lb. | Weight % |
|---|---|---|
| First Component (B) (Foaming agent) | | |
| Polyvinyl alcohol (pre-mixed about 11% aqueous solution) | 5-20 | 2.56-27.21 |
| Foamability enhancers (total) | (1.75-6.5) | — |
| Calcium chloride | 1.5-3.5 | 1.30-10.28 |
| Precipitated Calcium carbonate | .25-3.0 | 0.18-4.90 |
| Water | 15.5-25 | 11.97-36.76 |
| (B) batch weight - about | 25.25-51.5 | |
| Second Component (A) (Cement Composition) | | |
| Portland cement | 15-30 | 12.10-40.82 |
| Cement additives (total) | (9-29.5) | — |
| Precipitated Calcium carbonate | 5-12 | 3.79-18.32 |
| Sodium Metaborate (8 mol) | 2-4 | 1.46-6.61 |
| Glyoxal | .5-3.5 | 0.37-5.69 |
| e-Caprolactam | .25-3.0 | 0.18-4.90 |
| INDOPOL L-14 (polybutene polymer) | .25-1.0 | 0.18-1.69 |
| NORLIG - 41N or NORLIG - 24C | .5-3.0 | 0.37-4.92 |
| Urea (pre-mixed 50%/50% by wt. with hot water) | .5-3.0 | 0.37-4.92 |
| Water | 12-25 | 9.52-34.97 |
| (A) batch weight - about | 36-84.5 | |

In practicing Example III or IV, the foaming agent (B) is prepared by letting down or diluting the polyvinyl alcohol from 100% solid form into an about 11% by weight solution. The exact concentration may vary from about 8% to about 15%. This is followed by the calcium chloride, 1,3-butylene glycol or L-14, plus any other foamability enhancers, and the entire combination is mixed. This composition can then be stored and shipped as a concentrate, which can then be used, on site, by adding the concentrate to the indicated additional water.

The cement composition (A) is likewise prepared in separate batches. The so-called cement additives are initially mixed together and can then be stored and shipped as a concentrate. The total cement composition (A) can then be prepared, on site, by putting the additional water in a suitable container, such as a 50 gallon drum, adding the cement additives concentrate and mixing same, and then adding the Portland cement and mixing again. This simple process of mixing cement additives concentrate, water and Portland cement takes only about five minutes.

Air and the foaming agent (B) are each injected into the expansion chamber of a suitable foam insuation gun, and the aerated foaming agent then moves into the mixing chamber of the gun where the cement composition (A) is sprayed into the stream of aerated foaming agent (B), thereby mixing the total composition in the mixing chamber and adjacent application hose, that mixing occuring under laminar flow conditions.

Among the constituents of the First Component (B) or Foaming Agent, the following attributes may be noted. The precipitated calcium carbonate acts as a drying agent after being mixed with the cement component. Sodium metaborate is a catalytic cross linker for the polyvinyl alcohol system. Glyoxal spreads or extends the cement further over the foam system, and reacts with the polyvinyl alcohol component, and the caprolactam serves as a plasticizer for the cement. The polybutene oil is an extender which also retards water or water vapor flow through the final foam insulation product and retards water absorption in the final product. Norlig 41N or 24C is a dispersant which also retards said water or water vapor flow. Urea is a plasticizer or extender which also retards said water vapor flow and contributes non-burning properties. Foamability enhancers also generally increase the pot life of the Portland or other cement system.

Suitable foamability enhancers may also include: RP-251, a spray dried polyvinyl acetate; Duponol, an alkyl-lauryl sulfate alcohol; S-100, sulfonic acid; citric acid; sulfamic acid; aluminium chloride; ammonium chloride; zinc chloride; calcium cabonate; Glyoxal (OCHCHO); NVX, a vinsol resin, Celkore, a saponified rosin; 1,3-butylene glycol; FC-100 fluorocarbon, a fluorinated alkyl amphoteric mixture; Hydrocal gypsum, calcium sulfate; Stepanol 207, ammonium alkyl ether sulfate; Norlig 24C, modified lignosulphonate binder; Norlig 41N, modified lignosulphonate binder; Daxad 21, monocalcium salt of polymerized aryl alkyl sulfonic acid; Maypon 4C, potassium cocoa hydrolyzed animal protein; quicklime; limestone; autoclaved lime aluminum silicates; Ivory soap, a fatty acid soap; Resinol 215, an aqueous dispersion of polymerized rosin; L-14, polybutene polymer of molecular weight of about 130; and magnesium carbonate. Such materials may also enhance non-flammability and low permeability and low water absorption. For example, quicklime, urea, gypsum, 1,3-butylene glycol, Glyoxal (OCHCHO), and L-14 polybutene oil or Ivory soap solution, particularly exhibit such characteristics in the compositions of the present invention.

Among the constituents of the Second Component (A) or cement composition, the following attributes may be noted. The polyvinyl alcohol flammability is greatly reduced by aqueous dilution to about 11%. Calcium chloride accelerates curing of cement and enhances foamability. Precipitated calcium carbonate or magnesium carbonate does the same, but to a lesser degree than calcium chloride, and acts as a drying agent.

A gun suitable for mixing and applying such cementitious foam insulation materials is disclosed in related U.S. patent application Ser. No. 412,371, filed Aug. 27, 1982, and published international application PCT/U.S. No. 83/01335, International Publication No. WO 84/00921, published Mar. 15, 1984, the disclosures of which are hereby incorporated by reference. While the gun disclosed therein is designed to mix and apply foam compositions formed from up to four separate streams of material, it is equally useful with the three-component (three-stream) compositions of the present invention.

As shown in FIG. 1 of the components used to generate the foam is compressed air provided by a conventional air compressor 11. Air is added at rates in the range of about 0.5 to 25 cubic feet per minute, or at pressures in the range of about 20 to 120 psi. The air is combined with a foaming agent (First Component) in a foaming chamber 12. The foaming agent is stored in a container 13 and delivered by a line 14 to a mixing valve 15 located at the entrance to the foaming chamber 12. The foaming chamber 12 is connected directly in series with a mixing or coating chamber 20 whereupon the flow of foam that is generated in the foaming chamber 12 flows directly into and through the mixing or coating chamber 20. A hose 30 is connected to the outlet of the mixing or coating chamber 20 through which the foam is dispensed into a wall cavity 31 or any other suitable region that is to be insulated. The hose 30 and the coating chamber 20 combine to provide a relatively long flow path 32 wherein the coating ingredients combine or mix with the foam under laminar flow conditions to create a well defined homogeneous mixture.

When compounded and foamed the advantageous self-supporting insulating foams of the present invention have wet densities in the range of about 3 to 30 pounds per cubic foot, and have dry or cured densities in the range of about 1 to 25 pounds per cubic foot. For example, such cured foams for building insulation applications typically have densities of 2 to 3 pounds per cubic foot, while such foams for roofing or other weight supporting applications may have somewhat higher dry densities.

In addition to the above-described components and complete cementitious foam insulation system, the present invention comprises novel and non-obvious chemical reactions which contribute to the desired ultimate result. Particularly, applicants have discovered that barium metaborate, and particularly sodium metaborate, catalytically initiate and accelerate cross-linking polymerization of polyvinyl alcohol. This reaction is quite useful in immediately providing the foam insulation product with a foam matrix having substantial integrity virtually immediately upon installation. Concentrations of barium metaborate in Second Component (A) cement compositions in the range of about 0.20–6.0 wt. %, and of sodium metaborate in the range of about 2.0–10.0 wt. %, when used in conjunction with First Component (B) foaming compositions comprising aqueous polyvinyl alcohol solutions of concentration in the range of about 18–42 wt. %, are suitable for achieving the desired cross-linking effect.

Calcium chloride will react with cement to accelerate substantially hardening of the cement, when compared to that cement's typically hardening time in the absence of calcium chloride. Calcium chloride concentrations in First Component (B) drawing compositions in the range of about 1.5–12.0 wt. % when used with Second Component (A) cement compositions having cement concentrations of about 30–55 wt. % may be suitable for achieving the desired effect.

Furthermore, in the overall foamed cementitious insulation composition of the present invention the metaborate/polyvinyl alcohol reaction and calcium chloride/cement reaction complement each other by accelerating hardening of the cement on the rapidly produced cross-linked polyvinyl alcohol foam matrix.

Furthermore applicants have discovered that a further advantageous reaction takes place between calcium chloride and Norlig 24C, a modified lignosulfonate binder or Norlig 41N, another lignosulfonate binder. It has been discovered that the reaction between calcium chloride and Norlig, advantageously contributes to the claimed foam products in a manner similar to that described for metaborate/polyvinyl alcohol reaction. It is believed that calcium chloride insolubilizes Norlig 26C and 41N lignosulfonates by reacting with metal salts which are present, and forming insoluble salts at a pH in the range of about 8.5 to 9.5. This reaction enhances reinforcement of the cellular cement structure.

EXAMPLE V

In another modified version of the inventive composition, the following components are used:

|  | By Weight, lb. | Wt. % |
|---|---|---|
| First Component (B) (Foaming Agent) | | |
| Tamol SD (spray dried) | .5–1.5 | 0.34–2.03 |
| Magnesium sulfate | 1–2.5 | 0.68–3.36 |
| Sodium metaborate | .5–3 | 0.34–3.97 |
| Norlig 24C or 41N | .5–2 | 0.34–2.68 |
| Water | 20–35 | 15.09–39.77 |
| (B) batch weight, about | 22.5–44 | — |
| Second Component (A) (Cement Composition) | | |
| Portland cement | 15–35 | 11.76–37.63 |
| Polyvinyl alcohol | 15–35 | 11.76–37.63 |
| Norlig 24C or 41N | .5–3.5 | 0.35–4.61 |
| Water | 20–30 | 14.55–36.14 |
| (A) batch weight, about | 50.5–103.5 | — |

In this Example the Tamol is the primary foaming agent.

Other compositions having other constituents or proportions may be suitable for use in the present invention, but the scope of the present invention is intended to be generally indicated by the following claims.

What is claimed is:

1. A process for producing a self-supporting insulating foam, comprising the steps of:
   (a) mechanically foaming with air a foamable first component comprising polyvinyl alcohol and water;
   (b) mixing a second cement component with said foamed first component, said second cement component comprising an aqueous solution or mixture of a cementitious material, a dispersant and a member selected from the group consisting of barium metaborate and sodium metaborate;
   (c) shaping the resultant mixture; and
   (d) allowing the shaped mixture to set thereby forming a self-supporting insulating foam.

2. The process of claim 1, wherein the foamable first component additionally comprises at least one foamability enhancer selected from the group consisting of polyvinyl acetate; alkyl lauryl sulfate; sulfonic acid; citric acid; sulfonic acid; aluminum chloride; ammonium chloride; calcium carbonate; 1,3-butylene glycol; ammonium alkyl ether sulfate; mono-calcium salt of polymerized aryl alkyl sulfonic acids; quicklime; clay; polybutene polymer; and magnesium carbonate.

3. The process of claim 1, wherein the foamable first component additionally comprises an ammonium salt of polymeric carboxylic acid.

4. The process of claim 1, wherein the foamable first component additionally comprises calcium chloride, and precipitated calcium carbonate.

5. The process of claim 4, wherein the foamable first component additionally comprises 1,3-butylene glycol or polybutene polymer.

6. The process of claim 1, wherein the foamable first component additionally comprises an extender selected from the group consisting of: precipitated calcium carbonate, feldspar, perlites, microspheres, phenolic balloon spheres, zeospheres, talc, alumina trihydrate, clay and regular carbonates.

7. The process of claim 1, wherein the cementitious material comprises a material selected from the group consisting of magnesium oxide, Portland cement, hydraulic cement, aluminous cement, gypsum, or gypsum cement.

8. The process of claim 1, wherein the cementitious component comprises Portland cement.

9. The process of claim 1, wherein the cement component additionally comprises a sodium salt of carboxylated polyelectrolyte, and barium metaborate.

10. The process of claim 1, wherein the cement component additionally comprises at least one cement additive selected from the group consisting of precipitated calcium carbonate, sodium metaborate, Glyoxal (OCHCHO), e-caprolactam, polybutene polymer, lignosulfonate binders, and urea.

11. A thermal insulation foam produced by the pocess of claim 1.

12. A thermal insulation foam produced by the process of claim 7.

13. A self-supporting insulating foam composition comprising:
   (a) a foamable first component comprising polyvinyl alcohol, a first dispersant and water, in combination with air, and
   (b) a cementitious second component comprising an aqueous composition or suspension of magnesium oxide and barium metabaorate, and a second dispersant.

14. The self-supporting insulating foam composition of claim 13, wherein said first and second dispersant are independently selected from the group consisting of a sodium salt of a carboxylated polyelectrolyte and an ammonium salt of polymeric carboxylic acid.

15. The self-supporting insulating foam composition of claim 13, wherein said cementitious second component further comprises calcium carbonate.

16. The self-supporting insulating foam composition of claim 15, wherein said calcium carbonate is precipitated calcium carbonate.

17. The self-supporting insulating foam composition of claim 13, wherein said foamable first component further comprises an extender selected from the group consisting of precipitated calcium carbonate, feldspar, perlite, microspheres, phenolic balloons, zeospheres, talc, aluminum trihydrate, clay and regular carbonates.

18. The self-supporting insulating foam composition of claim 13, wherein said foamable first component further comprises a 1–5% by weight solution of soap in water.

19. The self-supporting insulating foam composition of claim 13, wherein said foamable first component provides support for said cementitious component until said cementitious component hardens.

20. The self-supporting insulating foam composition of claim 13, wherein said polyvinyl alcohol and said barium metaborate react to provide an integral foam matrix, said foam matrix supporting said cementitious second component until hardening.

21. A self-supporting insulating foam composition comprising:
   (a) a foamable first component comprising from 15.5 to 21.2 weight percent of polyvinyl alcohol, from 33.9 to 38.8 weight percent of water, and from 0.3 to 1.7 weight percent of a sodium salt of a carboxylated poyelectrolyte, in combination with air; and
   (b) a cementitious second component comprising from 7.7 to 15.3 weight percent of at least one cementitious material selected from the group consisting of magnesium oxide, Portland cement, hydraulic cement, aluminous cement, gypsum and gypsum cement, from 0.6 to 1.7 weight percent of barium metaborate, from 25.4 to 36.2 weight percent of water, and from 0.6 to 0.9 weight percent of a sodium salt of a carboxylated polyelectrolyte.

22. The self-supporting insulating foam composition of claim 21, wherein said cementitious material is magnesium oxide.

23. The self-supporting insulating foam composition of claim 21, wherein said polyvinyl alcohol and said barium metaborate react to provide an integral foam matrix, said foam matrix supporting said cementitious material until hardening.

24. The self-supporting insulating foam composition of claim 21, wherein said first component and said second component are pre-mixed concentrates.

25. A self-supporting insulating foam composition, comprising:
   (a) a foamable first component comprising an aqueous solution of polyvinyl alcohol and calcium chloride, in combination with air; and
   (b) a cementitious second component comprising an aqueous mixture of at least one cementitious material selected from the group consisting of magnesium oxide, Portland cement, hydraulic cement, aluminous cement, gypsum and gypsum cement, a dispersant and sodium metaborate.

26. The self-supporting insulating foam composition of claim 25, wherein said foamable first component provides support for the cement formed by said cementitious second component.

27. The self-supporting insulating foam composition of claim 25, wherein said polyvinyl alcohol and said sodium metaborate react to provide an integral foam matrix, said foam matrix supporting said cementitious second component until hardening.

28. The self-supporting insulating foam composition of claim 27, wherein said calcium chloride and said cementitious material react to accelerate hardening of said cementitious material.

29. The self-supporting insulating foam composition of claim 28, wherein said polyvinyl alcohol and said sodium metaborate reaction, and said calcium chloride and said cementitious material reaction, combine to accelerate hardening of said cementitious material on said foam matrix.

30. A self-supporting insulating foam composition, comprising:
   (a) a foamable first component comprising from 4.32 to 30.42 weight percent of polyvinyl alcohol, from 1.17 to 7.51 weight percent of calcium chloride, 0.20 to 7.34 weight percent of precipitated calcium carbonate, from 1.58 to 10.95 weight percent of 1,3 butylene glycol or a polybutene polymer and from 9.78 to 34.04 weight percent of water, in combination with air; and
   (b) a cementitious second component comprising from 13.54 to 49.47 weight percent of at least one cementitious material selected from the group consisting of magnesium oxide, Portland cement, hydraulic cement, aluminous cement, gypsum and gypsum cement, from 0.20 to 5.61 weight percent of precipitated calcium carbonate, from 1.94 to 8.53 weight percent of sodium metaborate, from 0.78 to 5.69 weight percent of glyoxal, from 0.39 to 3.37 weight percent of $\epsilon$-caprolactam, from 0.19 to 3.81 weight percent of a polybutene polymer, from 0.39 to 4.74 weight percent of a modified lignosulfonate binder and from 8.64 to 38.02 weight percent of water.

31. The self-supporting insulating foam composition of claim 30, wherein said first component and said second component are pre-mixed concentrates.

32. The self-supporting insulating foam composition of claim 30, wherein said foamable first component further comprises a foamability enhancer selected from the group consisting of a spray dried polyvinyl acetate, an alkyl-lauryl sulfate alcohol, sulfonic acid, citric acid, sulfamic acid, aluminum chloride, ammonium chloride, zinc chloride, calcium carbonate, glyoxal, vinsol resin, saponified rosin, 1,3-butylene glycol, a fluorinated alkyl amphoteric mixture, calcium sulfate, ammonium alkyl ether sulfate, a modified lignosulfonate binder, monocalcium salt of polymerized aryl alkyl sulfonic acid, potassium cocoa hydrolyzed animal protein, quicklime, limestone, autoclaved lime, aluminum silicates, a fatty acid soap, an aqueous dispersion of polymerized rosin, a polybutene polymer having a molecular weight of 130, magnesium carbonate, urea and gypsum.

33. The self-supporting insulating foam composition of claim 30, wherein said polyvinyl alcohol and said sodium metaborate react to provide an integral foam matrix, said foam matrix supporting said cementitious second component until hardening.

34. The self-supporting insulating foam composition of claim 33, wherein said calcium chloride and said cementitious material react to accelerate hardening of said cementitious material.

35. The self-supporting insulating foam composition of claim 34, wherein said polyvinyl alcohol and said sodium metaborate reaction, and said calcium chloride and said cementitious material reaction, combine to accelerate hardening of said cementitious material on said foam matrix.

36. The self-supporting insulating foam composition of claim 30, wherein said calcium chloride and said modified lignosulfonate binder react to provide an integral foam matrix, said foam matrix supporting said cementitious second component until hardening.

37. A self-supporting insulating foam composition, comprising:
   (a) a foamable first component comprising from 2.56 to 27.21 weight percent of polyvinyl alcohol, from 1.30 to 10.28 weight percent of calcium chloride, from 0.18 to 4.90 weight percent of precipitated calcium carbonate and from 11.97 to 36.76 weight percent of water, in combination with air; and
   (b) a cementitious second component comprising from 12.10 to 40.82 weight percent of at least one cementitious material selected from the group consisting of magnesium oxide, Portland cement, hydraulic cement, aluminous cement, gypsum and gypsum cement, from 3.79 to 18.32 weight percent of precipitated calcium carbonate, from 1.46 to 6.61 weight percent of sodium metaborate, from 0.37 to 5.69 weight percent of glyoxal, from 0.18 to 4.90 weight percent of ϵ-caprolactam, from 0.18 to 1.69 weight percent of a polybutene polymer, from 0.37 to 4.92 weight percent of a modified lignosulfonate binder, from 0.37 to 4.92 weight percent of urea and from 9.52 to 34.97 weight percent of water.

38. The self-supporting insulating foam composition of claim 37, wherein said first component and said second component are pre-mixed concentrates.

39. The self-supporting insulating foam composition of claim 37, wherein said foamable first component further comprises a foamability enhance selected from the group consisting of a spray dried polyvinyl acetate, an alkyl-lauryl sulfate alcohol, sulfonic acid, citric acid, sulfamic acid, aluminum chloride, ammonium chloride, zinc chloride, calcium carbonate, glyoxal, vinsol resin, saponified rosin, 1,3-butylene glycol, a fluorinated alkyl amphoteric mixture, calcium sulfate, ammonium alkyl ether sulfate, a modified lignosulfonate binder, monocalcium salt of polymerized aryl alkyl sulfonic acid, potassium cocoa hydrolyzed animal protein, quicklime, limestone, autoclaved lime, aluminum silicates, a fatty acid soap, an aqueous dispersion of polymerized rosin, a polybutene polymer having a molecular weight of 130, magnesium carbonate, urea and gypsum.

40. The self-supporting insulating foam composition of claim 37, wherein said polyvinyl alcohol and said sodium metaborate react to provide an integral foam matrix, said foam matrix supporting said cementitious second component until hardening.

41. The self-supporting insulating foam composition of claim 40, wherein said calcium chloride and said cementitious material react to accelerate hardening of said cementitious material.

42. The self-supporting insulating foam composition of claim 41, wherein said polyvinyl alcohol and said sodium metaborate reaction, and said calcium chloride and said cementitious material reaction, combine to accelerate hardening of said cementitious material on said foam matrix.

43. The self-supporting insulating foam composition of claim 37, wherein said calcium chloride and said modified lignosulfonate binder react to provide an integral foam matrix, said foam matrix supporting said cementitious second component until hardening.

44. A self-supporting insulating foam composition comprising:
 (a) a foamable first component comprising from 0.34 to 2.03 weight percent of a sodium salt of a carboxylated polyelectrolyte, from 0.68 to 3.36 weight percent of magnesium sulfate, from 0.34 to 3.97 weight percent of sodium metaborate, from 0.34 to 2.68 weight percent of a modified lignosulfonate binder and from 15.09 to 39.77 weight percent of water in combination with air; and
 (b) a cementitious second component comprising from 11.76 to 37.63 weight percent of at least one cementitious material selected from the group consisting of magnesium oxide, Portland cement, hydraulic cement, aluminous cement, gypsum and gypsum cement, from 11.76 to 37.63 weight percent of polyvinyl alcohol, from 0.35 to 4.61 weight percent of a modified lignosulfonate binder and from 14.55 to 36.14 weight percent of water.

45. The self-supporting insulating foam composition of claim 44, wherein said first component and said second component are pre-mixed concentrates.

* * * * *